(12) United States Patent
Dainez et al.

(10) Patent No.: US 9,915,260 B2
(45) Date of Patent: Mar. 13, 2018

(54) SYSTEM FOR CONTROLLING A RESONANT LINEAR COMPRESSOR PISTON, METHOD FOR CONTROLLING A RESONANT LINEAR COMPRESSOR PISTON, AND RESONANT LINEAR COMPRESSOR

(71) Applicants: WHIRLPOOL S.A., Sao Paulo (BR); FUNDACAO UNIVERSIDADE DO ESTADO DE SANTA CATARINA-UDESC, Florianopolis (BR)

(72) Inventors: Paulo Sergio Dainez, Campinas (BR); Jose de Oliveira, Joinville (BR); Ademir Nied, Joinville (BR)

(73) Assignees: Whirlpool S.A. (BR); Fundacao Universidade do Estado de Santa Catarina-UDESC (BR)

( * ) Notice: Subject to any disclaimer, the term of this patent is extended or adjusted under 35 U.S.C. 154(b) by 0 days.

(21) Appl. No.: 15/291,613

(22) Filed: Oct. 12, 2016

(65) Prior Publication Data

US 2017/0030345 A1 Feb. 2, 2017

Related U.S. Application Data

(62) Division of application No. 13/696,253, filed as application No. PCT/BR2011/000131 on May 5, 2011, now Pat. No. 9,518,578.

(30) Foreign Application Priority Data

May 5, 2010 (BR) .................................... 1001388

(51) Int. Cl.
 *F04B 49/06* (2006.01)
 *F04B 51/00* (2006.01)
 (Continued)

(52) U.S. Cl.
 CPC ............ *F04B 49/065* (2013.01); *F04B 35/04* (2013.01); *F04B 35/045* (2013.01); *F04B 49/06* (2013.01);
 (Continued)

(58) Field of Classification Search
 CPC ...... F04B 2201/0202; F04B 2203/0409; F04B 35/045; F04B 49/06; F04B 49/065;
 (Continued)

(56) References Cited

U.S. PATENT DOCUMENTS 4,642,547 A 2/1987 Redlich
5,342,176 A * 8/1994 Redlich ................. F04B 35/045
 318/687

(Continued)

FOREIGN PATENT DOCUMENTS

EP 1 349 265 A1 10/2003
JP 11-336661 12/1999

(Continued)

OTHER PUBLICATIONS

International Search Report dated Apr. 18, 2012 for International application No. PCT/BR2011/000131.

(Continued)

*Primary Examiner* — Dominick L Plakkoottam
(74) *Attorney, Agent, or Firm* — Fay Sharpe LLP

(57) ABSTRACT

A control method and a system for controlling the piston of a resonant linear compressor including at least one electronic control unit, the electronic control unit including at least one observing electronic circuit and at least one control circuit associated to each other. The observing electronic circuit is configured for: measuring at least one electric magnitude of the electric motor; estimating at least one set of electric parameters and at least one set of mechanical parameters of the resonant linear compressor; and estimating (Continued)

and providing at least one control parameter of the system for the control circuit based on the measured electric magnitude measured and on the estimated set of electric and mechanical parameters. The control circuit is configured for actuating the electric motor from the at least one control parameter.

15 Claims, 8 Drawing Sheets

(51) Int. Cl.
*F04B 53/14* (2006.01)
*H02P 27/08* (2006.01)
*F04B 53/00* (2006.01)
*H02K 7/14* (2006.01)
*H02P 25/32* (2006.01)
*F04B 35/04* (2006.01)
*F04B 49/10* (2006.01)
*H02K 33/16* (2006.01)
*H02P 25/032* (2016.01)

(52) U.S. Cl.
CPC ............ *F04B 49/103* (2013.01); *F04B 51/00* (2013.01); *F04B 53/003* (2013.01); *F04B 53/14* (2013.01); *H02K 7/14* (2013.01); *H02K 33/16* (2013.01); *H02P 25/032* (2016.02); *H02P 27/08* (2013.01); *F04B 2201/0202* (2013.01); *F04B 2201/0206* (2013.01); *F04B 2203/0409* (2013.01)

(58) Field of Classification Search
CPC ............ F04B 49/103; F04B 2203/0402; F04B 2201/0201; F04B 2203/0401; F04B 35/04; F04B 17/04; F04B 2201/0206; F04B 49/12; F04B 49/16; F04B 51/00; H02P 25/032; H02P 23/0004; H02P 27/00; H02P 27/08; G05B 17/02; G05B 23/0254; G05B 23/0297; H02K 33/16; H02K 7/14

See application file for complete search history.

(56) References Cited

U.S. PATENT DOCUMENTS

| | | |
|---|---|---|
| 5,496,153 A | 3/1996 | Redlich |
| 5,897,296 A | 4/1999 | Yamamoto et al. |
| 6,176,683 B1 | 1/2001 | Yang |
| 7,025,571 B2* | 4/2006 | Jeun ................... F04B 49/065 318/400.08 |
| 8,894,380 B2* | 11/2014 | Kang ................... F04B 17/04 417/417 |
| 2003/0026701 A1 | 2/2003 | Yoo et al. |
| 2003/0164691 A1* | 9/2003 | Ueda et al. |
| 2004/0119434 A1* | 6/2004 | Dadd ................... G05B 17/02 318/490 |
| 2005/0031470 A1 | 2/2005 | Lee |
| 2006/0171814 A1* | 8/2006 | Dainez ................ F04B 35/045 417/44.1 |
| 2007/0001630 A1* | 1/2007 | Dainez ................ H02P 23/0004 318/109 |

FOREIGN PATENT DOCUMENTS

| | | |
|---|---|---|
| KR | 96 15062 | 10/1999 |
| KR | 96 79125 | 1/2000 |
| WO | WO 00/79671 | 12/2000 |
| WO | WO 01/71186 | 9/2001 |
| WO | WO 03/044365 | 5/2003 |
| WO | WO 2004/025120 | 3/2004 |

OTHER PUBLICATIONS

Written Opinion dated Apr. 18, 2012 for International application No. PCT/BR2011/000131.
International Preliminary Report on Patentability dated Nov. 15, 2012 for International application No. PCT/BR2011/000131.

\* cited by examiner

SYSTEM FOR CONTROLLING A RESONANT LINEAR COMPRESSOR PISTON, METHOD FOR CONTROLLING A RESONANT LINEAR COMPRESSOR PISTON, AND RESONANT LINEAR COMPRESSOR

CROSS-REFERENCE TO RELATED APPLICATIONS

This application is a divisional of co-pending U.S. application Ser. No. 13/696,253 filed Mar. 14, 2013 (Mar. 14, 2013), which is the U.S. National Phase of PCT International application No. PCT/BR2011/000131 filed May 5, 2011 (May 5, 2011), which claims priority from Brazilian Application No. PI1001388-1 filed on May 5, 2010 (May 5, 2010), and the entire disclosure of each of these applications is hereby expressly incorporated by reference into the present application.

FIELD OF THE INVENTION

The present invention relates to a control system for the piston of a resonant linear compressor, especially designed for operating at its maximum efficiency, such a system being capable of actuating said compressor without using sensors for measuring mechanical magnitudes or variables.

The present invention further relates to a method of controlling the piston of a resonant linear compressor, the steps of which enable one to estimate the velocity and the displacement of said piston, in order to control the compressor motor efficiently.

Additionally, the present invention relates to a resonant linear compressor provided with a control system as proposed in the presently claimed object.

BACKGROUND

Alternating-piston compressors generate pressure by compressing the gas inside a cylinder through axial movement of the piston, so that the gas on the low-pressure side, i.e., the side of suction or evaporation pressure, goes into the cylinder through the suction valve. The gas is then compressed inside the cylinder by piston movement and after having been compressed it comes out of cha cylinder through the discharge valve to the high-pressure side, i.e., the side of discharge pressure or condensation.

Especially for resonant linear compressors, the piston is actuated by a linear actuator, which is formed by a support and magnets that can be actuated by one or more coils. The linear compressor further comprises one or more springs, which connect the moveable part (piston, support magnets) to the fixed part, the latter being formed by the cylinder, stator, coil head and frame. The moveable parts and the springs form the resonant assembly of the compressor.

Such a resonant assembly, driven by a linear motor, has the function of developing a linear alternating movement, causing the movement of the piston inside the cylinder to exert a compression action of the gas admitted through the suction valve as far as it can be discharged through the discharge valve into the high-pressure side.

The operation amplitude of the linear compressor is regulated by balance of the power generated by the motor, with the power consumed by the compression mechanism, besides the losses generated in this process. In order to achieve maximum thermodynamic efficiency and maximum cooling capacity, the maximum displacement of the piston should come as close as possible to the end of stroke, thus reducing the dead gas volume in the compression process.

In order to make this process feasible, it is necessary for the piston stroke to be known in great accuracy, so as to prevent the risk of piston impact at the end of the stroke on the equipment head. This impact might generate an acoustic noise, loss of efficiency of the apparatus or even breakdown of the compressor.

Thus, the greater the error in estimating/measuring the piston power the greater the safety coefficient required between maximum displacement and the stroke end, to operate the compressor in security, which leads to loss of performance of the product.

On the other hand, if it is necessary to reduce the cooling capacity of the compressor due to less need to use the cooling system, it is possible to reduce the maximum piston-operation stroke, thus reducing the power supplied by the compressor, and so it is possible to control the cooling capacity of the compressor, thereby obtaining a varying capacity. An important additional characteristic in operating resonant linear compressors is the actuation frequency thereof. A few prior techniques show that actuating the compressor at its resonance frequency causes the equipment to work at its maximum efficiency.

However, such techniques usually make use of position and/or velocity sensors for operating the system, which increases the final costs of the product considerably.

Hereinafter one makes a brief description of prior-art solutions employed today for knowing the compressor-piston stroke. The documents cited below make use of position sensors, for example the Brazilian case PI 0001404-4. This document further has the disadvantages of difficulty of isolation and electric contact noise.

Document PI 0203724-6 relates to a fluid pump and a fluid-transfer plate, such elements being particularly applicable to linear compressors for detecting the position of the respective piston and preventing the latter from colliding with the fluid-transfer plate or the valve plate upon variations in the operation conditions of the compressor, or even variations in the feed voltage. Such a technique employs en inductive sensor mounted on the valve plate, in order to measure the piston/plate distance directly at the piston top. This is a high-precision solution, but it requires space for installing the sensor on the valve plate and is more expensive, besides requiring calibration.

Other prior-art solutions, like those described in documents U.S. Pat. No. 5,897,296, JP 1,336,661 and U.S. Pat. No. 5,897,269, make use of a position sensor. Therefore, such applications exhibit greater implementation and/or maintenance complexity, besides a higher cost. It should be further pointed out that, in these latter cases, there is a need for a greater number of wires and external connections to the compressor, which makes difficult the use thereof in environments of great variation in temperature and pressure.

On the other hand, a few prior-art technique that do not use position sensors, like documents U.S. Pat. Nos. 5,342,176, 5,496,153, 4,642,547 and U.S. Pat. No. 6,176,683, besides KR 96-79125, KR 96-15062, WO00079671 and WO03044365, do not exhibit good accuracy or operation stability, for which reason it is necessary to employ other types of sensors, such as temperature meters or accelerometer for detecting impact, besides a more expensive sizing for the compressor in view of the requirements of performances for its correct functioning.

On the basis of the foregoing, the present invention foresees a system and a method for controlling the pistons of a resonant linear compressor, especially designed for actuating the compressor at its maximum efficiency, without using sensors to measure mechanical magnitudes or variables.

OBJECTIVES OF THE INVENTION

A first objective of the present invention is to provide a control system for controlling the piston of a resonant linear compressor, capable of actuating the compressor at its resonance frequency, so as to obtain the maximum efficiency of the equipment in cooling systems.

A second objective of the present invention is to provide a method capable of estimating the displacement and the velocity of the piston of a resonant linear compressor, starting from a mass/spring model and an electric model of compressor motor, using only electric magnitudes measured on said motor.

A third objective of the present invention is to reduce the cost of the compressor by eliminating sensors that are usually intended to measure mechanical magnitudes or variables, such as position, velocity, temperature and pressure sensors, and the consequent reduction of the number of wires and connections required for the functioning of the resonant linear compressor.

A further objective of the present invention is to provide actuation of the resonant linear compressor with a reduced safety coefficient between the maximum displacement of the piston and the stroke end, so as to optimize the functioning of the equipment, besides obtaining maximum performance of the compressor, without impairing the reliability and safety of the product.

Finally, another objective of the present invention is to provide a substantially simplified solution with respect to the prior-art techniques for large-scale production.

BRIEF DESCRIPTION OF THE INVENTION

A way to achieve the objectives of the present invention is by providing a control system for controlling the piston of a resonant linear compressor, the resonant linear compressor being an integral part of a cooling circuit, the resonant linear compressor comprising at least one cylinder, at least one compressor-head, at least one electric motor and at least one spring, the cylinder housing the piston operatively, the control system comprising at least one electronic control unit, the electronic control unit comprising at least one watching electronic circuit and at least one control circuit electrically associated to each other, the electronic control unit being electrically associated to the electric motor of the resonant linear compressor, the watching electronic circuit being configured to measure at least one electric magnitude of the electric motor of the resonant linear compressor, the watching electronic circuit being configured to estimate at least one set of electric parameters of the resonant linear compressor and at least one set of mechanical parameters of the resonant linear compressor, the watching electronic circuit being configured to estimate and provide at least one control parameter of the system for the control circuit starting from the electric magnitude measured and the set of electric and mechanic parameters estimated, the control circuit being configured to actuate the electric motor of the resonant linear compressor starting from the control parameters estimated, the control parameters estimated comprising at least one maximum displacement of the compressor piston, the control circuit actuating the motor of the resonant linear compressor starting from the control parameters estimated.

A second way to achieve the objectives of the present invention is by providing a control method for controlling the piston of a resonant linear compressor, the resonant linear compressor comprising at least one electric motor, the electric motor being actuated by a frequency inverter, the control method comprising the following steps:

a) measuring, at each operation cycle of the resonant linear compressor, with a discretization frequency, a measured current of the electric motor;

b) calculating an operation cycle of the resonant linear compressor starting from the measured current of the electric motor and, on the basis of the operation cycle calculated, calculating a resonance frequency of the resonant linear compressor;

c) calculating, at each operation cycle of the resonant linear compressor, at the discretization frequency, a calculated current of the motor, a piston displacement and a piston velocity;

d) calculating, at each operation cycle of the resonant linear compressor, at the discretization frequency, a current error calculated by the difference between the measured current and the calculated current of the motor;

e) calculating, in one operation cycle, on the basis of the piston displacement calculated in step c, a maximum piston displacement of the resonant linear compressor;

f) calculating, in one operation cycle, a real input power of the electric motor starting from the measured current and from an operation voltage applied by the inverter of the electric motor;

g) calculating, in one operation cycle, a power dissipated in an electric resistance of the motor starting from the measured current;

h) calculating a total dampening force and from the piston velocity calculated in step c);

i) calculating a power dissipated by the total dampening starting from the total dampening force calculated in the preceding step and from the piston velocity calculated in step c);

j) calculating an equivalent continuous force as a function of the real input power in the electric motor calculated in step f) and as a function of the operation cycle calculated in step b);

k) calculating, by starting from the maximum piston displacement and velocity and from the measured current, an operation-voltage value to be applied on the electric motor of the linear compressor; and' l. applying to the electric motor of the resonant linear compressor the operation-voltage value calculated in step k).

It should be mentioned that the above method further comprises a step for calculating a total spring coefficient of the resonant linear compressor, starting from the resonance frequency calculated in step b), and a total dampening coefficient of the resonant linear compressor, calculated starting from the power balance.

In another embodiment, the objectives of the present invention are achieved by providing a control method for controlling the piston of a resonant linear compressor, the resonant linear compressor comprising at least one electric motor, the electric motor being actuated electrically by a frequency inverter, the control method comprising the following steps:

i) measuring, by starting from a microprocessed electronic circuit and in one operation cycle of the resonant linear compressor, a measured current of the electric motor;

ii) calculating, based on the measured current and in an operation voltage applied to the inverter of the electric motor, at least one set of electric parameters of the motor and at least one set of mechanical parameters of the linear compressor;

iii) calculating, based on the values measured and calculated in steps i) and ii), maximum displacement and a velocity of the piston of the resonant linear compressor;

iv) adjusting, by starting from the maximum displacement and velocity of the piston obtained in step iii), a new value for the operation voltage to be applied to the inverter of the electric motor of the linear compressor; and v) applying to the inverter of the electric motor of the resonant linear compressor the operation voltage adjusted in step iv).

Finally, the objectives of the present invention are achieved by providing a resonant linear compressor that comprises a piston-control method as defined in the presently claimed object.

BRIEF DESCRIPTION OF THE DRAWINGS

The present invention is now described in greater details with reference to the attached drawings, in which.

DETAILED DESCRIPTION OF THE FIGURES

Figure 1:
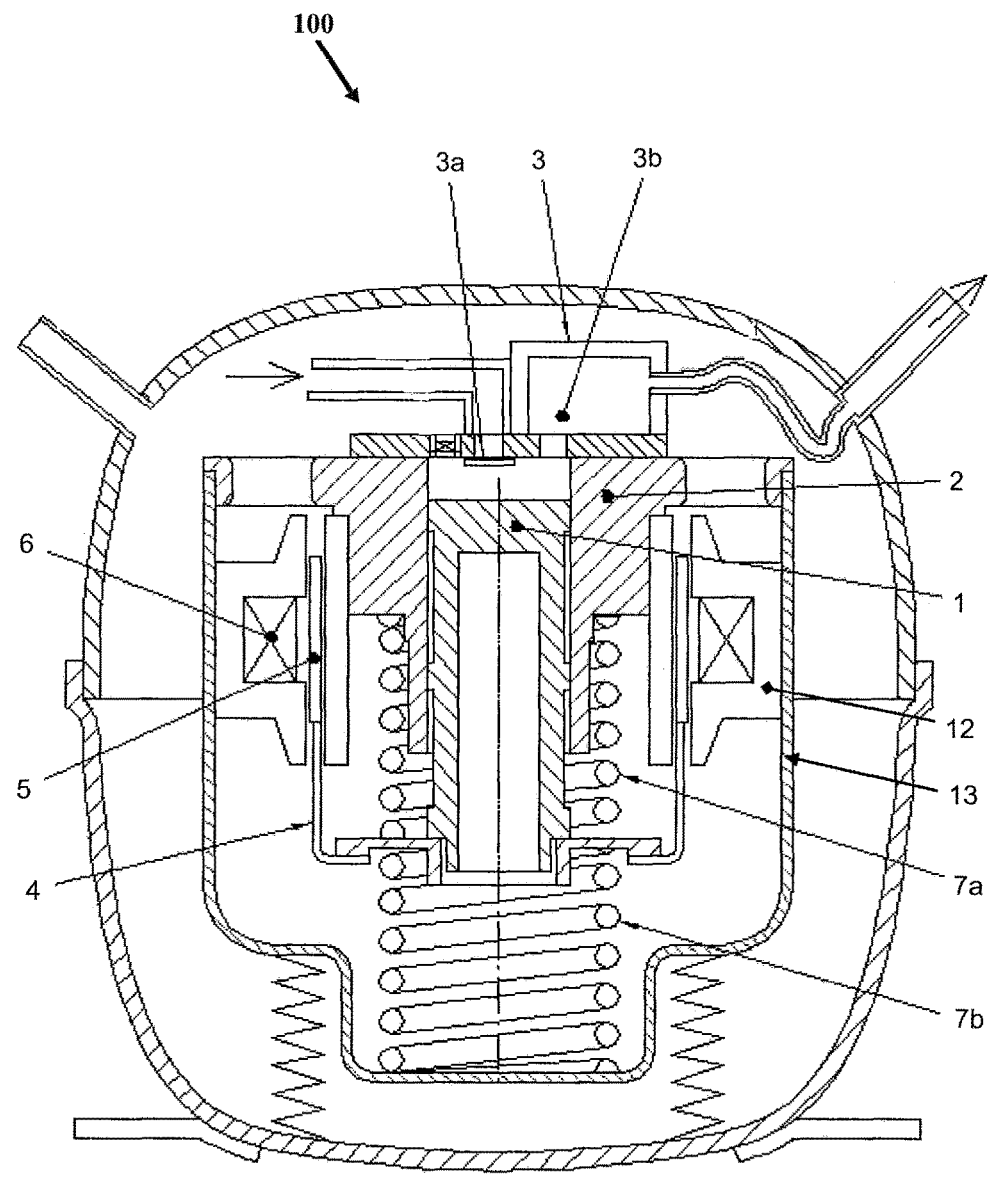
FIG. 1 represents a schematic view of a resonant linear compressor.

FIG. 1 shows a schematic view of a resonant linear compressor 100, employed in the present invention. In such piece of equipment, the piston is actuated by a linear actuator, which is formed by a support 4 and magnets 5 actuated by one of more coils 6. The same figure further shows that one or more springs 7a and 7b connect the moveable part (piston 1, support 4 and magnets 5) to the fixed part formed by the cylinder 2, stator 12, coils 6, head 3 and frame 13. The moveable parts and springs form the resonant assembly of the present compressor 100.

Thus, the resonant assembly actuated by the linear motor has the function of developing a linear alternating movement, causing the piston movement inside the cylinder to exert a gas-compressing force for compressing the gas admitted through the suction valve 3a until the point at which it can be discharged through the discharge valve 3b to the high-pressure side.

The operation amplitude of the linear compressor 100 is regulated by the balance of power generated by the motor and the power consumed by the mechanism upon compression, besides the losses generated in this process. In order to achieve maximum thermodynamic efficiency and maximum cooling capacity, the piston displacement has to come as close as possible to its end stroke, thus reducing the dead volume of gas in the compression process.

In order to make this process feasible, one has to know the piston stroke in accuracy, so as to prevent the risk of impact of the piston at the end stroke (head), since this impact may generate acoustic noise and loss of efficiency, or even breakdown of the compressor. Thus, the greater the estimation/measurement error of the piston position the greater the safety coefficient required between the maximum displacement and the end stroke, to operate the compressor in safety, which leads to loss of performance of the final equipment.

In the face of the foregoing, the present invention provides a system and method for controlling the piston of a linear compressor, capable of estimating accurately the velocity and the displacement of said piston, starting from a number of functioning parameters of said compressor, in a simplified and efficient manner. Such a compressor is an integral part of a cooling circuit and, as already mentioned, it comprises at least one cylinder 2, at least one head 3, at least one electric motor, besides at least one spring 7a/7b, so that the cylinder 2 will house the piston 1 operatively.

According to the teachings of the present invention, the control system proposed now comprises at least one electronic control unit 15, this unit being formed by at least one observing electronic circuit 20 and at least one control circuit 30 associated to each other. The electronic control unit 15 is associated electrically to the electric motor of the resonant linear compressor 100.

Figure 6:
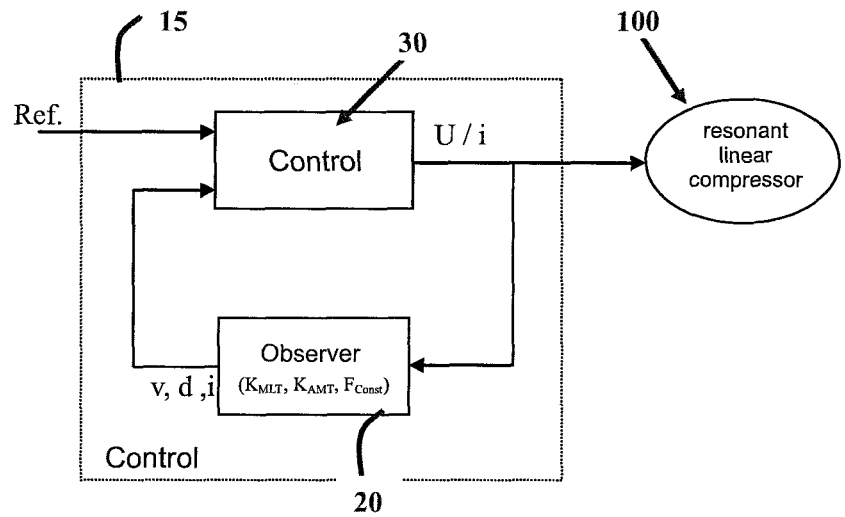
FIG. 6 shows a simplified block diagram of the control according to the teachings of the present invention.

FIG. 6 shows a simplified block diagram for the control system of the present invention.

In general, said observing electronic circuit 20 is configured to measure at least one electric magnitude of the electric motor of the resonant linear compressor 100, such observing circuit 20 being configured to estimate at least one set of electric parameters of the resonant linear compressor 100 and at least one set of mechanical parameters of the resonant linear compressor 100.

The observing electronic circuit 20 is configured and implemented preferably starting from a microprocessed electronic circuit, or an equivalent one.

FIGS. 6 to 10 illustrate block diagrams in which the electric and mechanical parameters are estimated. In other words, the observing electronic circuit 20 is configured to estimate and provide at least one control parameter $P_c$ of the system for the control circuit 30 starting from the measured electric magnitude and the set of electric and mechanical parameters.

The control circuit 30, in turn, is configured to actuate the electric motor of the resonant linear compressor 100 starting from the control parameters $P_c$ estimated. Such estimated control parameters $P_c$ comprise at least one maximum displacement Dmax of the piston 1 of the compressor 100.

Preferably, the control parameters $P_c$ further comprise a piston velocity $V_e(t)$ of the compressor 100, so that the control circuit 30 actuates the motor of the resonant linear compressor 100 starting from the values of the piston velocity $V_e(t)$ and maximum displacement Dmax estimated More preferably, the measured electric magnitude is composed by an operation current value $i_{m1}$, or simply measured current $i_m$, of the resonant linear compressor 100.

A quite innovatory characteristic of the present control system refers to the mathematical modeling proposed, formed by starting from an electric and mechanical model of the linear compressor 100.

Figure 2:
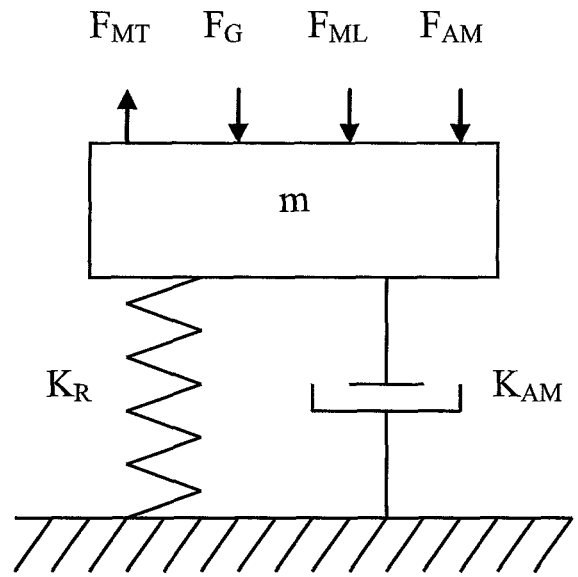
FIG. 2 illustrates a schematic view of the mechanical model of the resonant linear compressor employed in the present invention.
Figure 3:
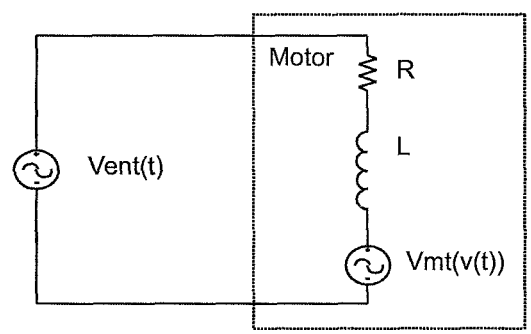
FIG. 3 illustrates a schematic view of the electric model of the resonant linear compressor of the present invention.

FIG. 2 illustrates a mechanical model of the linear compressor 100, while FIG. 3 shows an electric model for the same equipment.

In greater detail, the set of electric parameter is calculated from the electric mathematical model of the resonant linear compressor 100, such a model being defined on the basis of an RL electric in series with a voltage source, according to the following equation:

$$V_{ENT}(t)=V_R(i_e(t))+V_L(i_e(t))+V_{MT}(v_e(t)) \quad (1)$$

wherein:
$V_R(i_e(t))=R \cdot i_e(t)$; resistance voltage [V];

$$V_L(i_e(t)) = L \cdot \frac{di_e(t)}{dt};$$

inductor voltage [V];
$V_{MT}(v_e(t))=K_{MT} \cdot v_e(t)$; induced voltage of the motor or $F_{CEM}$ [V];
$V_{ENT}(t)$; feed voltage [V];
R; electric resistance of the motor of the compressor
L; inductance of the motor of the compressor (100)
$K_{MT}$; force and voltage Constant of the motor
$v_e(t)$; calculated piston velocity
$i_e(t)$; estimated or calculated current of the motor.

With regard to the mechanical modeling of the compressor, the setoff mechanical parameters is calculated starting from a mechanical mathematic model of the resonant linear compressor 100, so that said model is defined based on the mass/spring mechanical system according to the following equation:

$$m \cdot \frac{d^2 d_e(t)}{dt^2} = F_{MT}(i_e(t)) - F_{ML}(d_e(t)) - F_{AM}(v_e(t)) - F_G(d_e(t)) \quad (2)$$

wherein:
$F_{MT}(i_e(t))=K_{MT} \cdot i_e(t)$; motor force [N];
$F_{ML}(d_e(t))=K_{ML} \cdot d_e(t)$; spring force [N];
$F_{AM}(v_e(t))=K_{AM} \cdot v_e(t)$; dampening force [N];
$F_G(d(t))$; gas-pressure force in the cylinder [N];
$K_{MT}$; motor constant
$K_{ML}$; spring constant
$K_{AM}$; first dampening constant
m; mass of the moveable part
$d_e(t)$; calculated displacement of the piston of the compressor In a more comprehensive manner and according to the teachings of the present invention, it is possible to state that the set of electric parameters and the set of mechanical parameters, when combined, define a set of electromechanical parameters, which have the matrix form (3) according to the following equations:

$$\dot{x}(t)=A \cdot x(t)+B \cdot u(t)+F \cdot g(t)$$

$$y(t)=C \cdot x(t) \quad (3)$$

wherein:
$x(t)=(v_e(t) \; d_e(t) \; i_e(t))^T$; state vector
$y(t)=i_e(t)$; system output
$u(t)=V_{ENT}(t)$; feed voltage [V]
$g(t)=F_G(d(t))$; gas-pressure force in the cylinder [N];

$$A = \begin{pmatrix} -\frac{K_{AM}}{m} & -\frac{K_{ML}}{m} & \frac{K_{MT}}{m} \\ 1 & 0 & 0 \\ -\frac{K_{MT}}{L} & 0 & -\frac{R}{L} \end{pmatrix};$$

dynamic matrix of the system $$B = \begin{pmatrix} 0 & 0 & \frac{1}{L} \end{pmatrix}^T,;$$

feed input vector $$F = \begin{pmatrix} \frac{1}{m} & 0 & 0 \end{pmatrix}^T,;$$

pressure input vector
C=(0 0 1); output vector
$K_{MT}$; motor constant
$K_{ML}$; spring constant
$K_{AM}$; first dampening constant
R; electric resistance of the compressor
L; inductance of the motor of the compressor (100)
m; mass of the moveable part
$d_e(t)$; calculated displacement of the piston of the compressor
$v_e(t)$; calculated piston velocity
$i_e(t)$; motor current.

Figure 4:
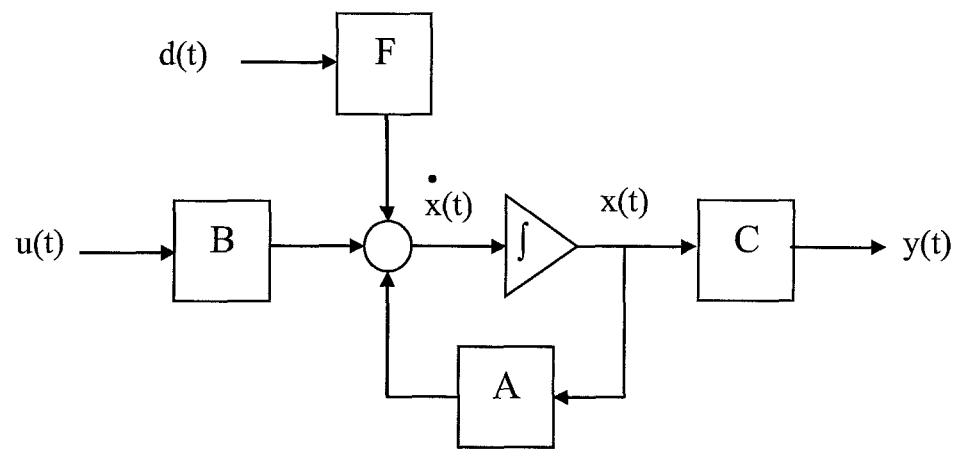
FIG. 4 illustrates a block diagram of the model of the resonant linear compressor.
Figure 5:
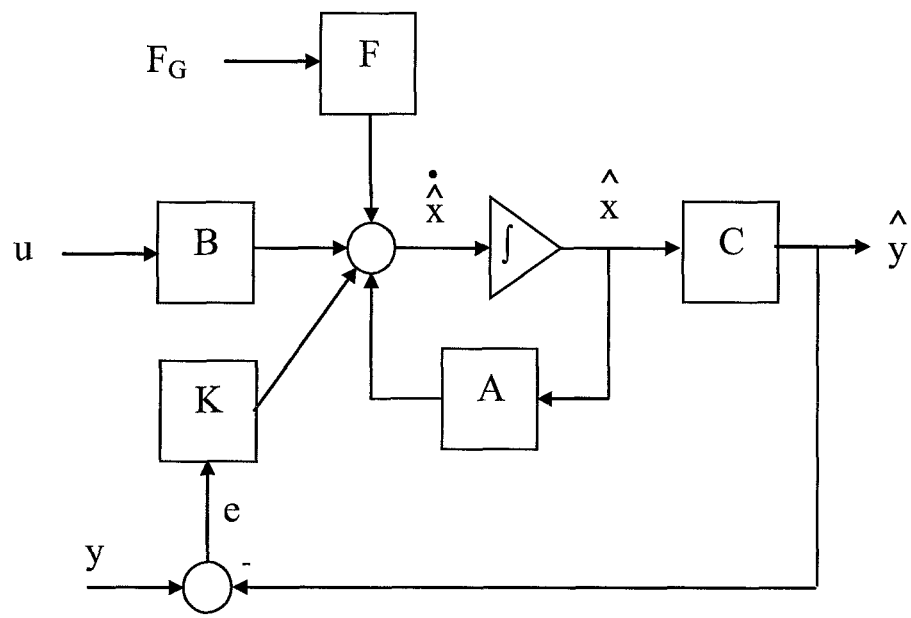
FIG. 5 shows a block diagram of the model of the state observer for the resonant linear compressor of the present invention.

On the basis of the matrix equation proposed in the present invention, and as shown in a block diagram in FIG. 4, the only system output is the electric current of the motor of the compressor 100, since the modeling developed takes into consideration only the measurement of electric magnitudes.

Figure 12:
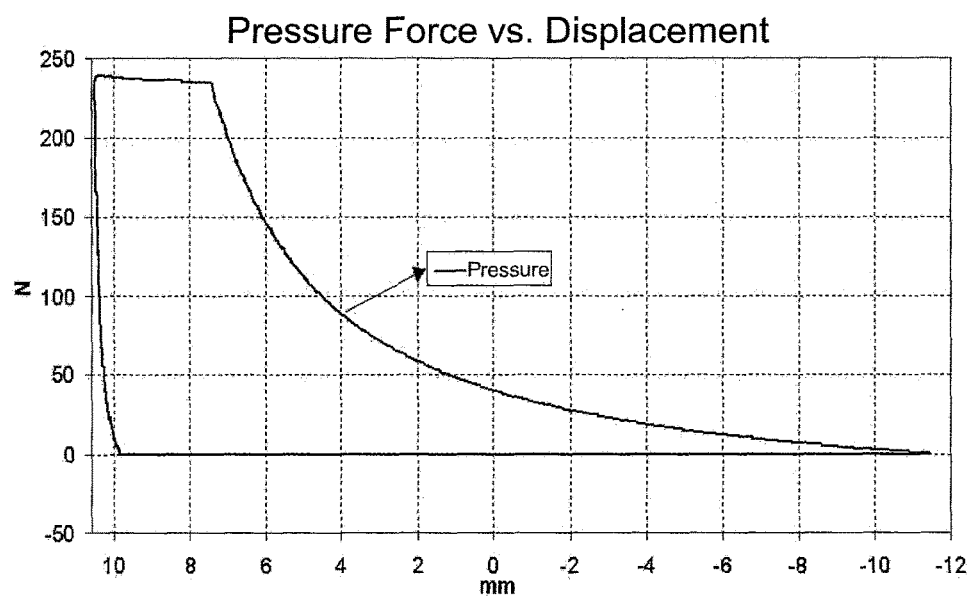
FIG. 12 shows a graph of the gas-pressure force.

It should be pointed out that the gas-pressure force $F_G(d(t))$, mentioned in the above matrix equation, varies with the suction and discharge pressures, as well as with the displacement of the piston 1, as illustrated in FIG. 12, among other linear and non-linear magnitudes of the system, a fact that justifies its application in the modeling proposed in the present object; otherwise significant errors might produce undesired effects in controlling the linear compressor 100.

Thus, the present invention compensates with the effects caused in the system by the gas-pressure force, since the latter brings about at least three main effects in said equipment, namely:
variation in the resonance frequency;
energy consumption that is transferred to the gas; and
displacement of the middle point of piston 1 oscillation (offset in the displacement).

Figure 13:
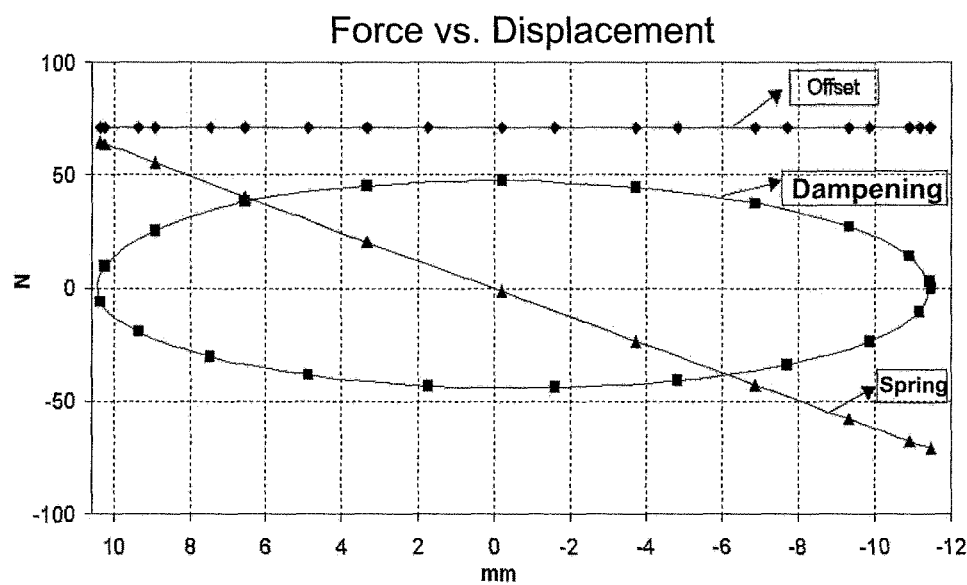
FIG. 13 shows a graph of the equivalent spring force, equivalent dampening force and equivalent continuous force (offset)
Figure 14:
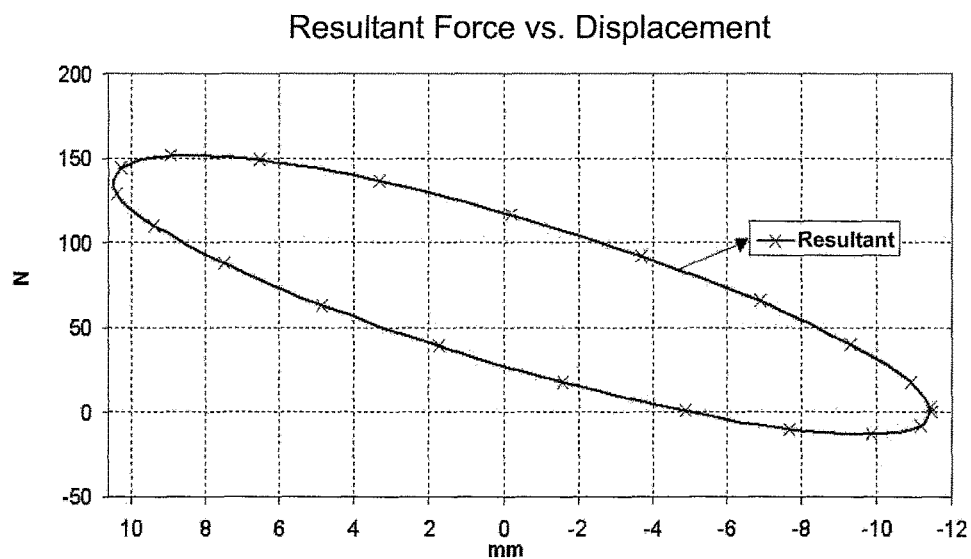
FIG. 14 shows a graph of the resulting force (sum of the 3 equivalent forces), according to the present invention.

In order to overcome the above effects, the present invention replaces the gas-pressure force $F_G(d(t))$ by other 3 linear forces that compensate the effects of this pressure force, which are: an equivalent spring force, an equivalent dampening force and an equivalent continuous force, as shown in FIGS. 13 and 14.

The equation below shows the calculation of the gas-pressure force and its respective attenuating forces:

$$F_G(t) = K_{AMEq} \cdot Vd + K_{MLEq} \cdot d + F_{Cont} \quad (4)$$

The equivalent spring force is adjusted to compensate the effects of variation in the resonance frequency, while the equivalent dampening force is adjusted to compensate the power consumption. On the other hand, the equivalent continuous force is adjusted to compensate the displacement of the middle point of piston oscillation.

It should be pointed out that adding a spring force is equivalent to add a second spring constant $K_{MLEq}$ in the mechanical equation to the linear nature of said forces. The same principle is valid for the second dampening constant $K_{AMEq}$ in the mechanical equation. The gas-pressure force is replaced, according to the present invention, by a continuous force $F_{Cont}$.

Thus, the presently proposed system may be represented by the equations below, so that, in this model, matrix A is variable as a function of $K_{MLEq}$ and $K_{AMEq}$, and the input g(t) is continuous.

$$\begin{pmatrix} \dot{v}(t) \\ \dot{d}(t) \\ \dot{i}(t) \end{pmatrix} = \begin{pmatrix} -\frac{K_{AM}+K_{AMEq}}{m} & -\frac{K_{ML}+K_{MLEq}}{m} & \frac{K_{FMT}}{m} \\ 1 & 0 & 0 \\ -\frac{K_{VMT}}{L} & 0 & -\frac{R}{L} \end{pmatrix} \cdot \begin{pmatrix} v(t) \\ d(t) \\ i(t) \end{pmatrix} + \quad (5)$$

$$\begin{pmatrix} 0 \\ 0 \\ \frac{1}{L} \end{pmatrix} \cdot V_{ENT}(t) + \begin{pmatrix} \frac{1}{m} \\ 0 \\ 0 \end{pmatrix} \cdot F_{Cont}$$

or:

$$\dot{x}(t) = A(K_{MLEg}, K_{AmEq}) \cdot x(t) + B \cdot u(t) + F \cdot g(t)$$

$$y(t) = C \cdot x(t)$$

wherein:

$$x(t) = \begin{pmatrix} v(t) \\ d(t) \\ i(t) \end{pmatrix},$$

$$y(t) = i(t), u(t) = V_{ENT}(t), g(t) = F_{Cont}$$

$$A = \begin{pmatrix} -\frac{K_{AM}+K_{AMEq}}{m} & -\frac{K_{ML}+K_{MLEq}}{m} & \frac{K_{FMT}}{m} \\ 1 & 0 & 0 \\ -\frac{K_{VMT}}{L} & 0 & -\frac{R}{L} \end{pmatrix},$$

$$B = \begin{pmatrix} 0 \\ 0 \\ \frac{1}{L} \end{pmatrix},$$

$$F = \begin{pmatrix} \frac{1}{m} \\ 0 \\ 0 \end{pmatrix},$$

$$C = (0 \quad 0 \quad 1)$$

It should be pointed out that, in the latter representation, what matters is not the isolated value of $K_{ML}$ and $K_{MLEq}$, or the portion of each constant, but rather the total value $K_{ML}+K_{MLEq}$, which means that it is possible to replace this sum by a single coefficient, called total spring coefficient $K_{MLT}$.

$$K_{MLT} = K_{ML} + K_{MLEq} \quad (6)$$

Such a total spring coefficient $K_{MLT}$ is adjusted to each cycle of the linear motor, according to a resonance frequency $F_R$ of the system, as shown in equation 7 below. The resonance frequency is adjusted to each cycle by the readout of the period of the real or measured current $i_m$ of the motor. FIG. 1 illustrates the profile of measured current $i_m$ of the motor characteristic in this type of application and the period of the resonance frequency.

$$F_R = \frac{1}{T_R} K_{MLT} = m \cdot 4 \cdot (\pi \cdot F_R)^2 \quad (7)$$

wherein:
$F_R$—resonance frequency
$T_R$—period of the resonance frequency

In a similar way, it is important to know the total value of the dampening constant ($K_{AM}+K_{AMEq}$). Therefore, it is possible to replace it by a single coefficient, called herein total dampening coefficient $K_{AMT}$, which is adjusted to each cycle of the linear motor.

$$K_{AMT} = K_{AM} + K_{AMEq} \quad (8)$$

An important feature in the present invention relates to the adjustment of power balance of the system. Such an adjustment is developed if the power measured at the entrance of the system is higher that the Power consumed by the total dampening force of the observer 20, plus the loss in the so-called resistance of the observer 20. Therefore, in this case, it becomes necessary to increase the total dampening coefficient $K_{AMT}$, otherwise one should decrease the total dampening coefficient ($K_{AMT}$).

The equations below show the calculation of the main magnitudes associated to the powers of the control system of the present invention:

$$a = \frac{T_R}{\Delta t} \quad (9)$$

$$P_e = \frac{1}{T_R} \sum_{n=0}^{a} u_C[n] \cdot i_M[n] \cdot \Delta t \quad (10)$$

$$P_R = \frac{1}{T_R} \sum_{n=0}^{a} R \cdot i[n]^2 \cdot \Delta t \quad (11)$$

-continued $$F_{AMT}[k] = K_{AMT} \cdot v[k] \quad (12)$$

$$P_{AM} = \frac{1}{T_R} \sum_{n=0}^{a} F_{AMT}[n] \cdot v[n] \cdot \Delta t \quad (13)$$

wherein:

α—number of samples in a period of the resonance frequency;

$P_e$—power measured at the entrance of the motor:

$P_R$—power at the resistance calculated by the estimator;

$F_{AM}$—force produced by the total dampening calculated by the estimator:

$P_{AM}$—power dissipated by the total calculated by the estimator;

$T_R$—period of the resonance frequency or period of one actuation cycle;

$\Delta t$—sampling period or period between two consecutive samples.

Figure 7:
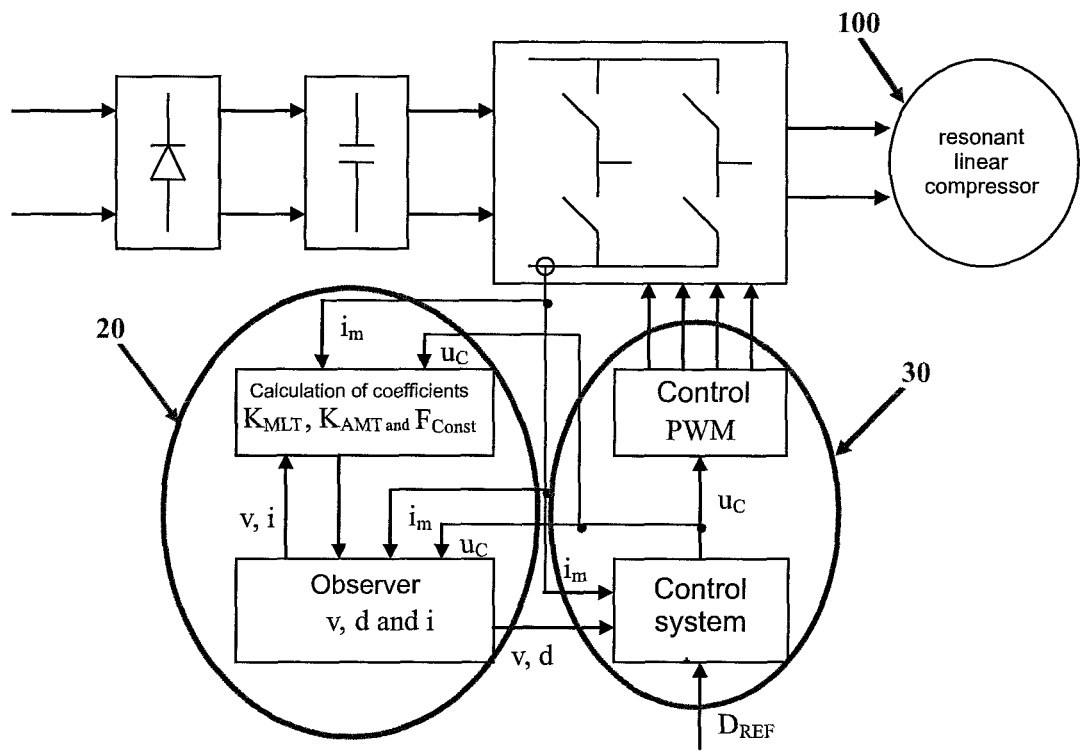
FIG. 7 shows a block diagram of the control and inverter of the present invention.

FIG. 7 shows in greater detail the main functional blocks of the control system for a piston 1, according to the teachings of the present invention.

Figure 8:
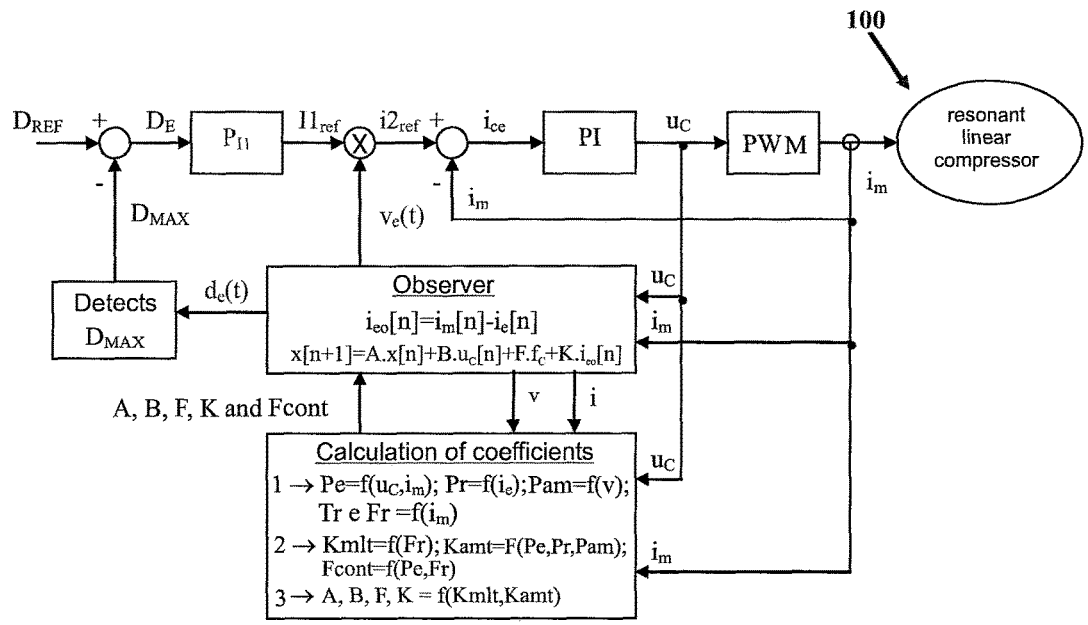
FIG. 8 illustrates a block diagram of the piston control system employing current and velocity values according to a preferred embodiment of the present invention.

FIG. 8 illustrates a block diagram for a preferred embodiment of the presently claimed control system.

Such a system, based on the set of electronic parameters described above, is again fed with a current error of the observer 20 $i_{eo}$ multiplied by a gain vector K, the current error $i_{eo}$ being calculated by the difference between the measured current $i_m$ and the calculated current of the motor $i_e(t)$.

Mathematically, the electromechanical model of the state observer of the resonant linear compressor 100 is equated in the matrix form by:

$$i_{eo}(t) = i_m(t) - i_e(t)$$

$$\dot{x}(t) = A \cdot x(t) + B \cdot u(t) + F \cdot g(t) + K \cdot i_{eo}(t)$$

$$y(t) = C \cdot x(t) \quad (14)$$

Figure 11:
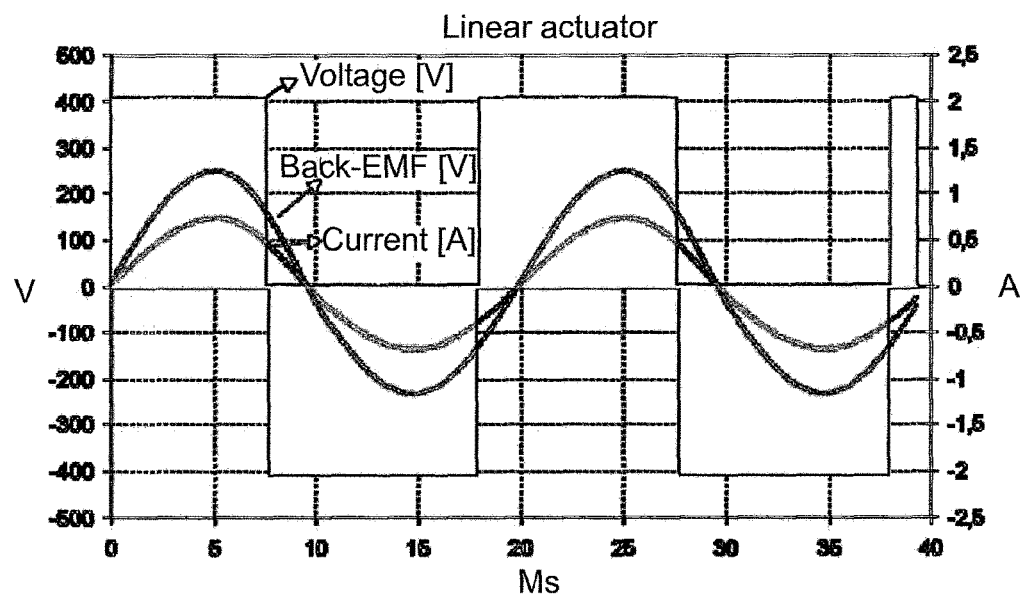
FIG. 11 shows a detached graph, among other magnitudes, the profile of the current measured linear compressor of the present invention.

Again, one should point out that the electric motor of the resonant linear compressor 100 is actuated through the control unit 15 at a resonance frequency $F_R$ calculated at each operation cycle $T_R$ of the linear compressor 100. Said operation cycle $T_R$ is measured through the measured current $i_m$ and calculated to have the period of the measured current $i_m$. FIG. 11, as already mentioned for the system of the present invention, illustrates the profile of said measured current $i_m$, it being possible to obtain its operation period by observing the moments at which the current $i_m$ passes through zero.

It is important to point out that the operation of the compressor 100 at the resonance frequency $F_R$ enables one to achieve maximum performance for the whole system, without impairing the reliability and safety of the final equipment.

Quite preferably, the calculated of the motor $i_e(t)$, the piston displacement de(t) and the piston velocity $v_e(t)$ of the linear compressor 100 are calculated at a discretization frequency $F_d$ that is substantially higher than the resonance frequency $F_R$, such discretization frequency $F_d$ being operable about 10 times or more the resonance frequency $F_R$.

The maximum displacement $D_{MAX}$ is calculated from the piston displacement $d_e(t)$ during one operation cycle $T_R$. Analogously, the set of mechanical parameters is calculated at each operation cycle $T_R$.

In FIG. 8 one can further observe that the actuation of the resonant linear compressor 100 is provided on the basis of an operation voltage $U_C$, this voltage $U_C$ being calculated on the basis of the calculated values of maximum displacement $D_{MAX}$ and piston displacement velocity $v_e(t)$. Such state values are compared with reference values through state controllers like PI (proportional and integral) of PID (proportional, integral and derivative).

As already mentioned before, the present invention provides an innovatory method for controlling the piston of a resonant linear compressor 100. Such a method foresees a compressor provided with an electric motor, the latter being actuated by a frequency inverter.

Said method essentially comprises the following step:

measuring each operation cycle $T_R$ of the resonant linear compressor 100, with a discretization frequency $F_d$, a measured current of $i_m$ of the electric motor;

calculating an operation cycle $T_R$ of the resonant linear compressor 100, from the measured current $i_m$ of the electric motor, and on the basis of the calculated operation cycle $T_R$ calculating a resonance frequency $F_R$ of the resonant linear compressor 100;

calculating each operation cycle $T_R$ of the resonant linear compressor 100 at the discretization frequency $F_d$, a calculated current of the motor $i_e(t)$, a piston displacement $d_e(t)$ and a piston velocity $v_e(t)$;

calculating each operation cycle $T_R$ of the resonant linear compressor 100, at the discretization frequency RF, a current error $i_{eo}$ calculated by the difference between the measured current $i_m$ and the calculated current of the motor $i_e(t)$;

calculating, on the basis of the piston displacement $d_e(t)$ calculated in step c), a maximum displacement $D_{MAX}$ of the piston of the resonant linear compressor 100;

calculating, in an operation cycle $T_R$, an input power of the real $P_e$ on the electric motor from the measured current $i_m$ and from an operation voltage $U_C$ applied by the inverter of the electric motor;

calculating, in an operation cycle $T_R$, a dissipated power $P_R$ as an electric resistance of the motor R from the measured current $i_m$;

calculating a total dampening force $F_{AMT}$, produced in an operation cycle $T_R$ from a total dampening coefficient $K_{AMT}$ and from the piston velocity $V_e(t)$ calculated in step c);

calculating a power dissipated by the total dampening $P_{AMT}$ from the total dampening force $F_{AMT}$ calculated in the preceding step and from the piston velocity $V_e(t)$ calculated in step c);

calculating en equivalent continuous force $F_{Cont}$ as a function of the real input power $P_e$ on the electric motor calculated in step f) and as a function of the operation cycle $T_R$ calculated in step b);

calculating, starting from the maximum displacement $D_{MAX}$ and from the piston velocity $V_e(t)$ and the measured current $i_m$, an operation voltage value $U_c$ to be applied to the electric motor of the linear compressor 100; and applying to the electric motor of the resonant linear compressor 100 the operation voltage value $U_c$ calculated in step k.

The present method further has a step for calculating the total spring coefficient $K_{MLT}$ of the resonant linear compressor 100, from the resonance frequency $F_R$ calculated in step b).

Additionally, the presently proposed method foresees a step for calculating the total dampening coefficient $K_{AMT}$ of the resonant linear compressor 100, from the real power $P_e$, dissipated power $P_R$ and power dissipated by the total dampening $P_{AMT}$.

With regard to the correction of said total dampening coefficient $K_{AMT}$, it is adjusted once per cycle starting from the following steps:

if the real input power $P_e$ calculated is higher than the sum of the power dissipated by the total dampening $P_{AMT}$ with dissipated power $P_R$, then increase the value of total dampening coefficient $K_{AMT}$ to a next operation cycle $T_R$; and if the real input power $P_e$ calculated is lower than the sum of the power dissipated by total displacement $P_{AMT}$ with the dissipated power $P_R$, then decrease the value of total dampening coefficient $K_{AMT}$ to a next operation cycle $T_R$.

Otherwise the total dampening coefficient $K_{AMT}$ is calculated on the basis of the following equations:

$$P_{AMT} = P_e - P_R \qquad (15)$$

$$K_{AMT} = \frac{2 \cdot P_{AMT}}{(2 \cdot \pi \cdot F_R \cdot D_{MAX})^2}$$

The total spring coefficient $K_{MLT}$ is calculated through the equation:

$$K_{MLT} = m \cdot 4 \cdot (\pi \cdot F_R)^2 \qquad (16)$$

wherein:

$F_R$=resonance frequency;

From the total spring coefficients $K_{MLT}$ and from total dampening $K_{AMT}$, one calculates and adjusts the observer model, so as to compensate the variation in suction and discharge pressures (obtaining an adaptive system). For the continuous model this adjustment only affects the dynamic matrix A and the design of the gain vector K. In practice, for discrete (or discretized) systems, the discretization process and the variation in the total spring coefficients $K_{MLT}$ and in total dampening $K_{AMT}$ also leads to a variation in the matrixes B and F.

Thus, starting from the total spring coefficients $K_{MLT}$ and from total dampening $K_{AMT}$ one calculates a set of matrixes A, B and F, in order to design a gain vector K. In other words, a first coefficient matrix A, a second coefficient matrix B, a third coefficient matrix F and a gain vector K, in an operation cycle $T_R$ of the resonant linear compressor 100, are calculated from the total spring coefficient $K_{AMLT}$ and total dampening coefficient $K_{AMT}$. In this case, the present system generates a model of variable coefficients, called also adaptive system, which is adjusted to each operation cycle of the compressor 100.

The method claimed in the present application leads to a mathematical modeling of the linear compressor 100, as already mentioned for the presently proposed control system.

At a first moment, the method foresees the use of an electric. Mathematical model of the compressor 100 defined on the basis of an electric circuit RL in series with a voltage source, equated through equation 1 already detailed before for the piston 1 control system. For a better understanding, equation 1 is reproduced below:

$$V_{ENT}(t) = V_R(i_e(t)) + V_L(i_e(t)) + V_{MT}(v_e(t)) \qquad (1)$$

The parameters and values referring to the above equation are the same shown before for the control system of the present invention.

Analogously, the piston control method according to the teachings of the present invention takes into account a mechanical mathematical modeling of the linear compressor 100, which is defined on the basis of a mass/spring mechanical system according to equation 2 below, already represented before:

$$m \cdot \frac{d^2 d(t)}{dt^2} = F_{MT}(i_e(t)) - F_{ML}(d_e(t)) - F_{AM}(v(t)) - F_G(d_e(t)) \qquad (2)$$

The mechanical parameters of the above equating are those defined for the piston 1 control system of the present invention. As already mentioned, the gas-pressure force in the cylinder $F_G(d(t))$ is calculated by equation 4, reproduced below for better understanding:

$$F_G(t) = K_{AMEq} \cdot Vd + K_{MLEq} \cdot d + F_{Cont} \qquad (4)$$

In another embodiment the control method proposed comprises an electronic mathematical model of the linear compressor 100 equated in the similar matrix form, as proposed for the control system, from equation 3 below, already defined before:

$$\dot{X}(t) = A \cdot x(t) + B \cdot u(t) + F \cdot g(t)$$

$$y(t) = C \cdot x(t) \qquad (3)$$

Therefore, the parameters of the above equation are those already defined for the modeling of the control system of the present invention.

In the method foreseen, the electronic mathematic model of the linear compressor 10, just as for the system developed, is again fed with a current error of the observer $i_{eo}$ multiplied by a gain vector K, the current error of the observer $i_{eo}$ being calculated by the difference between the measured current $i_m$ and the calculated current of the motor $i_e(t)$, the electronic mathematical model of the resonant linear compressor 100 being according to equation 14, reproduced below, already defined before for the control system:

$$i_{eo}(t) = i_m(t) - i_e(t)$$

$$\dot{x}(t) = A \cdot x(t) + B \cdot u(t) + F \cdot g(t) + K \cdot i_{eo}(t)$$

$$y(t) = C \cdot x(t) \qquad (14)$$

FIG. 8 shows, as already mentioned, a preferred embodiment for the control system and method proposed. For such a configuration, the following additional steps are foreseen:

adjusting a first reference electric current I1ref from the comparison between the maximum displacement $D_{MAX}$ of the piston calculated in step "e" and a programmed reference displacement $D_{REF}$;

adjusting a second reference electric current $i1_{ref}$ adjusted by the piston velocity $V_e(t)$ calculated in step c);

adjusting a control current error $(i_{ce})$ by the difference between the reference electric current $(I2_{ref})$ and the measured current $(i_m)$;

adjusting the operation voltage $(U_c)$ applied to the frequency inverter of the electric motor from the control current error $(i_{ce})$ calculated in the preceding step.

As shown in FIG. 8, the first reference electric current $I1_{ref}$ is generated an output of the first proportional and integral state controller $P_{I1}$. This controller may further be formed by a derivative proportional integral controller.

The same FIG. 8 shows that the operation voltage $U_c$ applied to the inverter of the electric motor is generated at an output of a second proportional and integral state controller $P_{I2}$ or a derivative proportional integral one.

In a more comprehensive manner, the present control method for a linear-compressor piston is configured by starting from the following steps:

measuring from a microprocessed electronic circuit and an operation cycle $T_R$ of the resonant linear compressor (100), with a discretized frequency $F_d$, a measured current $i_m$ of the electric motor;

calculating, on the basis of the measured current $i_m$ and of an operation voltage $U_c$ applied to the inverter of the electric motor, at least one set of electric parameters of the motor and at least one set of mechanical parameters of the linear compressor 100;

calculating, on the basis of the values measured and calculated in steps i) and ii), a maximum displacement $D_{MAX}$ and a piston velocity $V_e(t)$ of the resonant linear compressor 100;

adjusting, from the maximum displacement $D_{MAX}$ and the piston velocity $V_e(t)$ obtained in step iii), a new value for the operation voltage $U_c$ to be applied to the inverter of the electric motor of the linear compressor 100; and applying to the inverter of the electric motor of the resonant linear compressor 100 the operation voltage $U_c$ adjusted in step iv).

Again, it should be pointed out that the value of the operation voltage $U_c$ is calculated in an operation cycle $T_R$ of the resonant linear compressor 100, so that the operation cycle $T_R$ defines the operation of the linear compressor 100 at the resonance frequency $F_R$.

The method described above also takes into account that the set of electric parameters is calculated from an electric mathematical model of the resonant linear compressor 100. Just as described before, the set of mechanical parameters is calculated from a mechanical mathematical model of the resonant linear compressor 100, or still from an electromechanical mathematical model of the resonant linear compressor 100 defined on the basis of the sets of electric and mechanical parameters.

Equations 1 and 2 defined in the present invention are also applied to the more comprehensive methodology above, that is, to the electro motor of the compressor 100, modeled as an electric circuit RL in series, and to the same compressor 100 modeled as a mass/spring mechanical system.

The matrix equating defined by equation 3 applies also in the latter control method, starting from the conception of an electromechanical system.

Therefore, the system and method for controlling the piston 1 of a resonant linear compressor 100, as described in the present invention, achieve their objectives when a set of estimated parameters enables the operation of the compressor 100 at its maximum efficiency, without making use of sensors configured for measuring mechanical magnitudes or variables.

Figure 9:
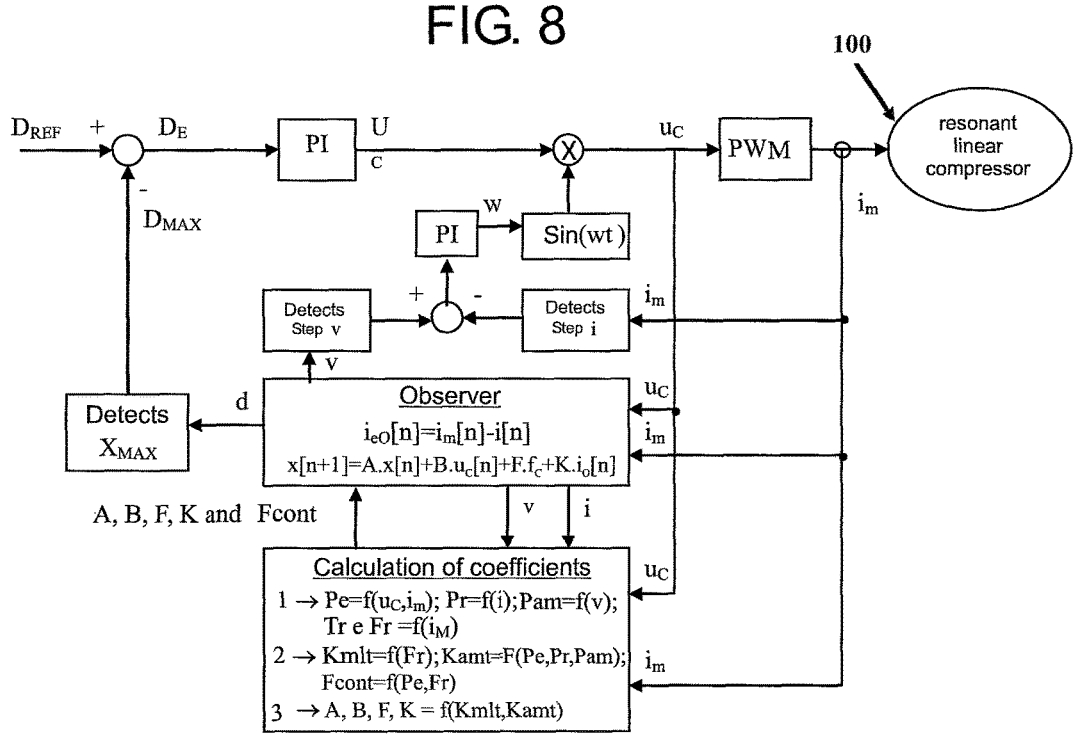
FIG. 9 illustrates a block diagram of the piston control system employing voltage and frequency values in a second embodiment of the present invention.
Figure 10:
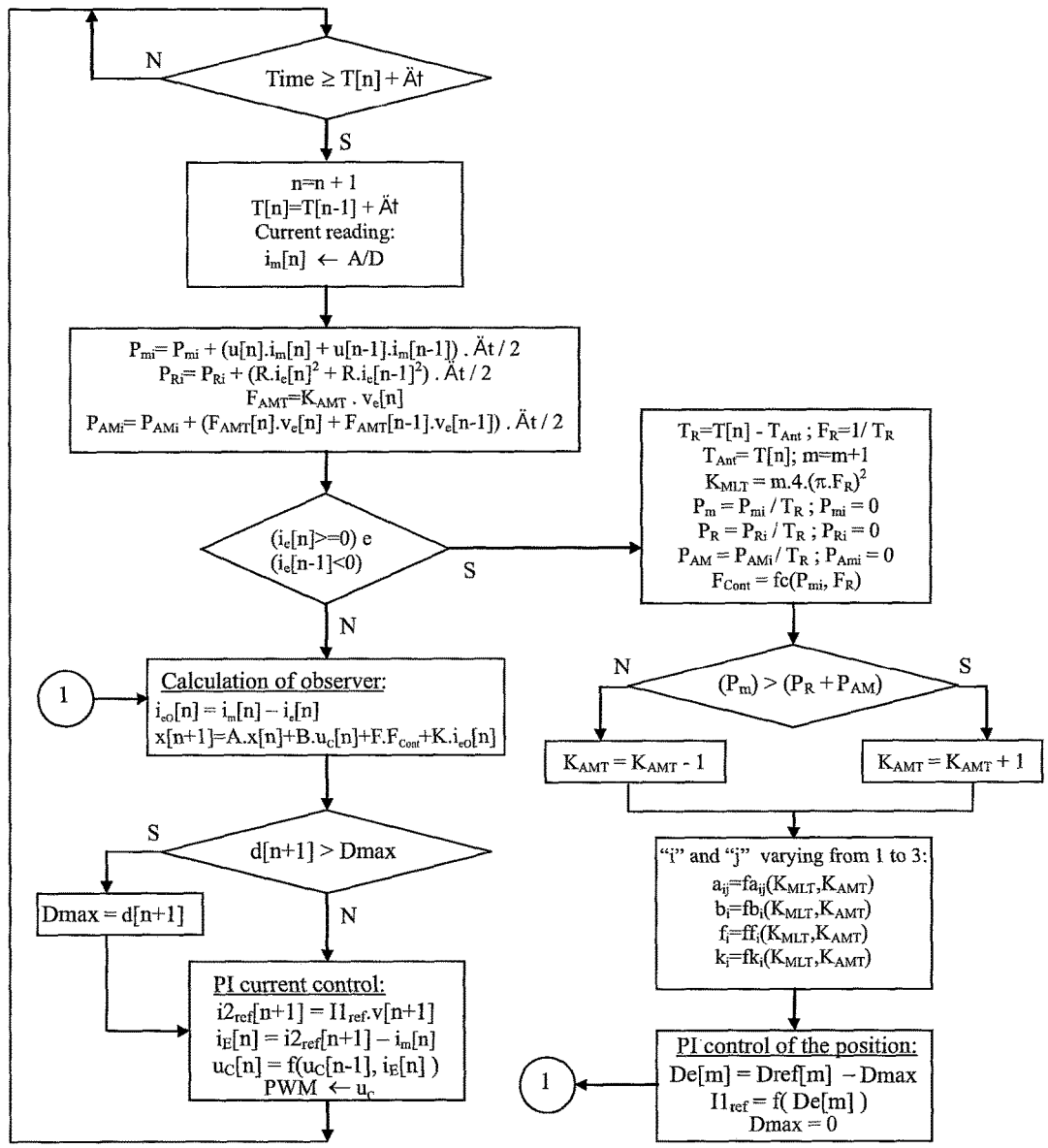
FIG. 10 represents a flow chart of the control method according to the steps foreseen in the present invention.

On one hand, the preferred embodiment shown in FIG. 8 impart to the presently claimed system a simple and efficient control for the compressor 100, employing the displacement and velocity of the piston 1 estimated by the observing electronic circuit 20, whereas the alternative embodiment shown in FIG. 9 enables a control capable of replacing the velocity signal by a senoidal signal in phase with said velocity.

Both solutions are capable of optimizing the efficiency of the compressor, without making use of auxiliary measuring devices, further taking into account the estimation of the maximum displacement $D_{MAX}$ of the piston 1, which contributes greatly to reducing the engineering time in installation, simplifying the production process for reduction of components and reduction of the number of connections required, and especially upon maintenance of the final equipment. Such solutions operate the present system in safety, thus enabling the piston 1 to work at its maximum course without colliding with the compressor head.

Finally, the present invention provides a resonant linear compressor 100 which comprises a piston-control method as defined in the presently claimed invention.

A preferred embodiment having been described, one should understand that the scope of the present invention embraces other possible variations, being limited only by the contents of the accompanying claims, which include the possible equivalents.

The invention claimed is:

1. A control method for controlling a piston of a resonant linear compressor, the resonant linear compressor (100) comprising at least one electric motor, the electric motor being actuated by a frequency inverter, the control method comprising the following steps:

a) measuring an operation current at one operation cycle of the resonant linear compressor (100);

b) calculating an operation period ($T_R$) of the resonant linear compressor (100) from the operation current of the electric motor measured in step a), and on the basis of the calculated operation period ($T_R$), calculating a resonance frequency ($F_R$) for the actuation of the resonant linear compressor;

c) calculating a current of the electric motor ($i_e(t)$), a piston displacement ($d_e(t)$) and a piston velocity ($v_e(t)$) at each one of the operation periods ($T_R$) of the resonant linear compressor (100) at a discretization frequency ($F_d$), d) calculating a current error ($i_{eo}$) by the difference between the operation current measured in step a) and the calculated current calculated in step c) at each one of the operation periods ($T_R$) of the resonant linear compressor (100);

e) calculating a maximum displacement ($D_{MAX}$) of the piston (1) of the resonance linear compressor (100) from the piston displacement ($d_e(t)$) calculated in step c);

f) calculating, from the maximum displacement ($D_{MAX}$) calculated in step e), from the piston velocity ($V_e(t)$) calculated in step c) and from the operation current ($i_m$) measured in step a), a value of operation voltage ($u_c$) to be applied to the electric motor of the linear compressor (100); and g) applying to the electric motor of the resonant linear compressor (100) the value of operation voltage ($u_c$) calculated in step k).

2. The control method for the piston of a resonant linear compressor according to claim 1, wherein an electric mathematical model of the linear compressor (100) is defined on the basis of an electric circuit RL in series with a voltage source and equated through the following(equation:

$$V_{ENT}(t) = V_R(i_e(t)) + V_L(i_e(t)) + V_{MT}(v_e(t))$$

wherein:

$V_R(i_e(t)) = R \cdot i_e(t)$; resistance voltage [V];

$$V_L(i_e(t)) = L \cdot \frac{di_e(t)}{dt};$$

inductor voltate [V];

$V_{MT}(v_e(t)) = K_{MT} \cdot v_e(t)$; voltage induced in the motor or FCEM [V];

$V_{ENT}(t)$; feed voltage [V];
R; electric resistance of the compressor motor
L; inductance of the compressor motor (100)
$K_{MT}$; constant of force and voltage of the motor
$v_e(t)$; calculated piston velocity
$i_e(t)$; calculated motor current.

3. The control method for the piston of a resonance linear compressor according to claim 1, wherein the mechanical mathematical model of the linear compressor (100) is defined on the basis of a mass/spring mechanical system equated through the following equation;

$$m \cdot \frac{d^2 d_e(t)}{dt^2} = F_{MT}(i_e(t)) - F_{ML}(d_e(t)) - F_{AM}(v_e(t)) - F_G(d_e(t))$$

wherein:
$F_{MT}(i_e(t)) = K_{MT} \cdot i_e(t)$; motor force [N];
$F_{ML}(d_e(t)) = K_{ML} \cdot d_e(t)$; spring force [N];
$F_{AM}(v_e(t)) = K_{AM} \cdot v_e(t)$; dampening force [N];
$F_G(d_e(t))$; gas-pressure force inside the cylinder [N];
$K_{MT}$; motor constant
$K_{ML}$; spring constant
$K_{AM}$; first dampening constant
m; mass of the moveable part
$v_e(t)$; piston velocity
$d_e(t)$; piston displacement
$i_e(t)$; calculated motor current.

4. The control method for the piston of a resonant linear compressor according to claim 1, further comprising an electromechanical mathematical model of the linear compressor (100), equated by:

$$\dot{x}(t) = A \cdot x(t) + B \cdot u(t) + F \cdot g(t)$$

$$y(t) = C \cdot x(t)$$

wherein:
$x(t) = (v_e(t)\ d_e(t)\ i_e(t))^T$; state vector
$y(t) = i_e(t)$; system output
$u(t) = V_{ENT}(t)$; feed voltage [V]
$g(t) = F_G(d(t))$; gas-pressure force in the cylinder [N];

$$A = \begin{pmatrix} -\frac{K_{AMT}}{m} & -\frac{K_{MLT}}{m} & \frac{K_{MT}}{m} \\ 1 & 0 & 0 \\ -\frac{K_{MT}}{L} & 0 & -\frac{R}{L} \end{pmatrix};$$

dynamic matrix of the system $$B = \begin{pmatrix} 0 & 0 & \frac{1}{L} \end{pmatrix}^T;$$

feed input vector $$F = \begin{pmatrix} \frac{1}{m} & 0 & 0 \end{pmatrix}^T;$$

pressure input vector
C = (0 0 1); output vector
$K_{MT}$; motor constant
$K_{ML}$; spring constant
$K_{AM}$; first dampening constant
R; electric resistance of the compressor
L; inductance of the motor of the compressor (100)
m; mass of the moveable part
$v_e(t)$; piston velocity;
$d_e(t)$; piston displacement;
$i_e(t)$: calculated current of the motor.

5. The control method for the piston of a resonant linear compressor according to claim 4, wherein the electromechanical mathematical model of the linear compressor (100) is again fed with the current error multiplied by a gain vector (K), the current error being calculated by the difference between the operation current ($i_m$) and the calculated current of the motor ($i_e(t)$), the electromechanical mathematical model of the resonant linear compressor (100) being equated by:

$$i_e(t) = i_m(t) - i_e(t)$$

$$\dot{x}(t) = A \cdot x(t) + B \cdot u(t) + F_G(t) + K \cdot i_{eo}(t)$$

$$y(t) = C \cdot x(t).$$

6. The control method for the piston of a resonant linear compressor according to claim 5, wherein the first coefficient matrix (A), the second coefficient matrix (B), the third coefficient matrix (F) and the gain vector (K), in one operation period ($T_R$) of the resonant linear compressor (100), are adjusted from a total spring coefficient ($K_{MLT}$) and a total dampening coefficient ($K_{AMT}$).

7. The control method for the piston of the resonant linear compressor according to claim 6, wherein the gas-pressure force inside the cylinder $F_G(t)$ is calculated by:

$$F_G(t) = K_{AMEq} \cdot v_e(t) + K_{MLEq} \cdot d_e(t) + F_{Cont}$$

wherein:
$K_{MLEq}$ = second spring constant;
$K_{AMEq}$ = second dampening constant; and
$F_{Cont}$ = equivalent continuous force.

8. The control method for the piston of a resonant linear compressor according to claim 7, wherein the total spring coefficient ($K_{MLT}$) is defined as the sum of the spring constant with the second spring constant, calculated through the equation:

$$K_{MLT} = K_{ML} + K_{MLEq}$$

wherein:
$K_{ML}$; spring constant
$K_{MLEq}$; second spring constant
$K_{MLT}$; total spring coefficient.

9. The control method for the piston of a resonant linear compressor according to claim 8, wherein the total spring coefficient ($K_{MLT}$) is calculated through the equation:

$$K_{MLT} = m \cdot 4 \cdot (\pi \cdot F_R)^2$$

wherein:
$K_{MLT}$; total spring coefficient
m; mass of the moveable part
$F_R$; resonance frequency.

10. The control method for the piston of a resonant linear compressor according to claim 8, wherein the spring force ($F_{ML}$) is calculated through the equation:

$$F_{ML}(d_e(t)) = K_{MLT} \cdot d_e(t)$$

wherein:
$F_{ML}$; spring force
$d_e(t)$; piston displacement;
$K_{MLT}$; total spring coefficient.

11. The control method for the piston of a resonant linear compressor according to claim 7, wherein the total dampening coefficient ($K_{AMT}$) is defined as the sum of the dampening constant with the second dampening constant calculated through the equation:

$$K_{AMT} = K_{AM} + K_{AMEq}$$

wherein:
$K_{AMEq}$; second dampening constant
$K_{AMT}$; total dampening coefficient
$K_{AM}$; first dampening constant.

12. The control method for the piston of a resonant linear compressor according to claim 11, wherein the total dampening coefficient ($K_{AMT}$) is calculated by the following equation:

$$P_{AMT} = P_E - P_R$$

$$K_{AMT} = \frac{2 \cdot P_{AMT}}{(2 \cdot \pi \cdot F_R \cdot D_{MAX})^2}$$

wherein:
$P_{AMT}$=power dissipated by the total dampening;
$P_E$=real input power;
$P_R$=power dissipated at the resistance of the motor; and
$D_{MAX}$=maximum piston displacement.

13. The control method for the piston of a resonant linear compressor according to claim 12, wherein:

a) if the calculated real input power (Pe) is higher than the sum of the power dissipated by the total dampening ($P_{AMT}$) with the dissipated power ($P_R$), then carry out a step of increasing the value of the total dampening coefficient ($K_{AMT}$) to a next operation period ($T_R$);

b) if the calculated real input power (Pe) is lower than the sum of the power dissipated by the total dampening ($P_{AMT}$) with the dissipated power ($P_R$), then carry out a step of decreasing the value of the total dampening coefficient ($K_{AMT}$) to the next operation period ($T_R$).

14. The control method for the piston of a resonant linear compressor according to claim 13, wherein a total dampening force is calculated through the equation:

$$F_{AM}(d_e(t)) = K_{AMT} \cdot d_e(t).$$

15. The control method for a piston (1) of a resonant linear compressor (100) according to claim 6, wherein the dynamic matrix of the system (A) is calculated through the equation:

$$A = \begin{pmatrix} -\dfrac{K_{AMT}}{m} & -\dfrac{K_{MLT}}{m} & \dfrac{K_{MT}}{m} \\ 1 & 0 & 0 \\ -\dfrac{K_{MT}}{L} & 0 & -\dfrac{R}{L} \end{pmatrix}$$

* * * * *